United States Patent [19]

Benedetti

[11] 4,433,473
[45] Feb. 28, 1984

[54] PROCESS FOR MANUFACTURING A FLYWHEEL MAGNETO

[75] Inventor: Carlo Benedetti, Pisa, Italy

[73] Assignee: Piaggio & C. S.p.A., Genoa, Italy

[21] Appl. No.: 283,463

[22] Filed: Jul. 15, 1981

[30] Foreign Application Priority Data

Jul. 22, 1980 [IT] Italy .................... 23614 A/80

[51] Int. Cl.³ .................................. H02K 15/02
[52] U.S. Cl. ............................. 29/598; 29/423; 310/42; 310/43; 310/153
[58] Field of Search .............. 29/598, 423, 523; 310/42, 43, 261, 153, 156

[56] References Cited

U.S. PATENT DOCUMENTS

| | | | |
|---|---|---|---|
| 3,258,623 | 6/1966 | Phelon et al. | 310/153 X |
| 3,818,586 | 6/1974 | Harkness et al. | 29/598 |
| 3,861,028 | 1/1975 | Mittag | 29/598 |
| 4,182,027 | 1/1980 | Benezech | 29/598 |

*Primary Examiner*—Carl E. Hall
*Attorney, Agent, or Firm*—Cushman, Darby & Cushman

[57] ABSTRACT

A method is disclosed for manufacturing a flywheel magneto of the radial magnetic flux type for motor bicycles, motor scooters and the like, which comprises the steps of forming a sub-assembly comprised of a ring, the magnets, the pole shoes by scotching said ring on a plurality of wedges placed around a cylindrical body whereafter the pole shoes and an inner ring of a metallic nonmagnetic material are positioned and a punch rams all these component parts forcibly together. Finally, the sub-assembly so composed is surrounded by a casting of a nonmagnetic material.

6 Claims, 5 Drawing Figures

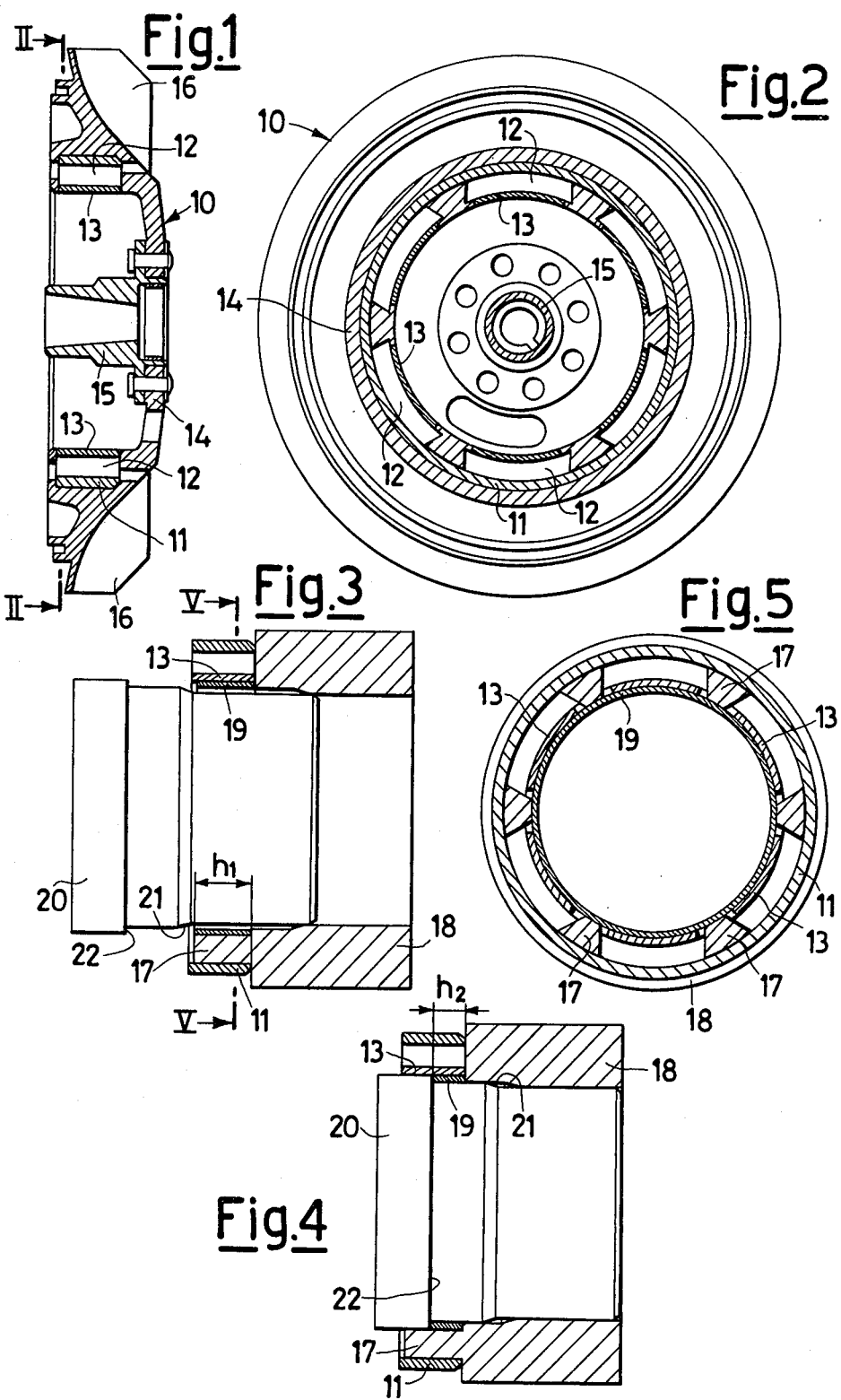

PROCESS FOR MANUFACTURING A FLYWHEEL MAGNETO

This invention relates to a method, which is very advantageous from the economical standpoint, for manufacturing a flywheel magneto having radial magnets.

The invention relates also to the flywheel magneto obtained with that process.

As is well known to those who are skilled in this particular field of the technology, there are two types of flywheel magneto, viz. a type with tangential magnetic flux and a type with radial magnetic flux.

The existence of these two different kinds of flywheel, having virtually equal dimensions and shapes for the component magnets, when the power is the same, is justified only by the opposite characteristics of intensity of the coercive force and the degree of residual magnetic induction of the material which forms the magnets.

The flywheel magneto having tangential-flux magnets, such as those made of a metallic alloy, can easily be constructed by arranging the magnets alternately in serial array relative to the pole shoes, which are obviously alternately polarized, so as to make up a continuous ring which can readily be inserted in the mould in which the material intended to embed the ferromagnetic material is to be cast. This kind of flywheel, however, has the defect of the present high price of the material of the magnets.

The kind of flywheel having radial magnetic flux magnets, such as those made of ceramic materials, which are alternately polarized in opposite sense and thus require an external circuit of a ferromagnetic material and pole shoes in radial contact with magnets, has, at present, a much lower cost for the magnets. This kind of flywheel, however, originates a constructional problem in order to maintain the position of even spacing apart of the magnets and their relevant pole shoes, which are no longer in tangential contact with each other, during casting of the material intended to embed them. An obvious solution of this problem is to adopt a positioning cage, made of a nonmagnetic material, which, of course, is permanently left encased in the casting. This approach, however, has a number of defects. One of these shortcomings is the cost of the cage as such and another problem, which is more serious, is the difficulty of maintaining with constructively acceptable limits the allowances in the radial dimensions of the magnets, of the ferromagnetic retaining ring, of the pole shoes and of the cage, so as to ensure, in any case, the mutual forcible engagement of all of these component parts and to form an integral entity to be introduced in the mould into which the encasing material is to be cast.

Appropriate expedients, such as that of providing for the cage, suitable protrusions in order to obtain an easier match by removing the material of these protrusion by drawing during the forcible introduction of the cage, have proven inadequate to the task.

An object of the present invention is to offset the defects enumerated above by providing a manufacturing method which permits to dispense with the cage aforementioned.

Having this object in view, according to the invention, it has been envisaged to provide a method for manufacturing a flywheel magneto of the radial magnetic flux type, characterized in that it comprises the step of forming a sub-assembly comprised of an external ring of a ferromagnetic material against which the magnets and their attendant pole shoes are forcibly assembled by ramming a temporary internal ring, the nonmagnetic body of the flywheel magneto being subsequently cast onto said sub-assembly.

The structural and functional features of the invention and its advantages over the prior art will become more clearly apparent from the ensuing exemplary description with reference to the accompanying drawings, wherein:

FIG. 1 is a cross-sectional view of a flywheel magneto constructed according to the method of this invention.

FIG. 2 is a cross-sectional view taken along the line II—II of FIG. 1.

FIGS. 3 and 4 are two cross-sectional views showing two manufacturing stages of the flywheel according to the invention, and FIG. 5 is a cross-sectional view taken along the line V—V of FIG. 3.

Having reference, at the outset to FIGS. 1 and 2 of the drawings, a flywheel magneto obtained according to the method of this invention is generally indicated at 10 and is comprised of a ring 11, made of a ferromagnetic material, in the interior of which radial magnets 12 are arranged, which are usually of a ceramic material, and their relative pole shoes 13, made of a ferromagnetic material.

The component parts 11, 12 and 13 make up a sub-assembly which is embedded in a casting 14, of a non-magnetic alloy and equipped with a hub 15 and vanes 16 for cooling the vehicle engine, usually a motorcycle, on which said flywheel magneto finds its most typical application.

According to the present invention, the sub-assembly comprised of the ring 11, the magnets 12 and the pole shoes 13 is prepared in the following manner.

Having now reference to FIGS. from 3 to 5 inclusive of the drawings, the ring 11 is scotched onto a plurality of wedged projections 17 extended from the periphery of either base of a cylindrical mould 18.

Subsequently, the magnets 12 are arranged in contact with the inner surface of the ring 11, between the projections 17 which ensure that the magnets are evenly spaced apart from each other. Thereafter, the pole shoes 13 are positioned along with an internal ring 19 which is made of a resilient material, generally a metallic material having an adequate plastic deformability. In the interior of the so assembled unit, a punch 20 (FIG. 4) is now forcibly introduced, the punch having an introductory bevel 21 and a ledge 22, so as to bring about a ramming and thus a radial expansion of the ring 19, such as to bring the height thereof from $h_1$ to $h_2$ (FIGS. 3 and 4). This operation is such as to work-harden the material of the ring 19 so as to induce a condition of elastic constriction, to which pressures against the pole shoes 13 correspond and thus thrusts between the pole shoes and the magnets 12 and also between the magnets and the ring 11, these strains being left also when the punch 20 is removed, and are sufficient for maintaining the component parts 11, 12, 13 and 19 forcibly assembled together in order to make up the sub-assembly outlined above.

These component parts, thus forcibly assembled together, are removed from the mould 18 and introduced in a mould wherein the casting of the body 14, which encases them, takes place.

Lastly, the turning of the internal surface of the flywheel 10 is carried out and is proceeded with until the ring 19 is completely destroyed together with a portion of the pole shoes 13 so as to provide the desired gap width between the pole shoes and the corresponding shoes of the armature secured to the supporting frame for the shaft on which the flywheel magnet is to be keyed.

By so doing, the problems inherent in the existence of the unavoidably wide allowances for the dimensions and the possibility of infiltrations detrimental to the permeability of the magnetic circuit of the casting during the casting operations between the surfaces of the magnets and those of the ferromagnetic component parts are successfully solved.

It is likewise apparent that an economy is achieved due to the absence of any connection element and any stop member for the component parts of the magnetic circuitry.

I claim:

1. A method of manufacturing a flywheel magneto of the radial flux type comprising forming a preassembled unit having an outer annular ring of a ferromagnetic material, a predetermined number of magnets positioned on the inner surface of the ring and a like number of pole pieces positioned on the inner surface of the magnets by permanently deforming an inner annular ring to retain the magnets and pole pieces in position against the outer annular ring, said permanent deformation being effected by exerting axial force to the ring thereby causing radial expansion thereof; and subsequently casting the flywheel body onto the pre-assembled unit.

2. The method according to claim 1 including machining the flywheel to remove the inner annular ring after casting the flywheel body.

3. The method according to claim 1 wherein the axial force is obtained from a punch member having a shaft with its diameter equal to the inner diameter of the inner ring and a ledge portion to forcibly contact the edge of the inner ring.

4. A method of manufacturing a flywheel magneto of the radial flux type, said method comprising forming a sub-assembly comprising an outer annular ring of a ferromagnetic material, a predetermined number of magnets positioned on the inner surface of the ring, a like number of pole pieces positioned on the inner face of the magnets and an inner annular ring, the forming operation including inserting a mandrel through the inner annular ring during assembly of the sub-assembly, the mandrel having a ledge to apply lateral force against the edge of the inner ring causing sufficient radial expansion to retain the pole pieces and magnets within the outer ring; casting a non-magnetic body onto the sub-assembly; and machining the inner face of the deformed inner ring to entirely remove the inner ring.

5. The method according to claim 4 where during formation of the sub-assembly the magnets are spaced equidistantly around the outer annular ring using a mold having projections which extend between the magnets and is removed after deformation of the inner annular ring.

6. The method according to claim 4 wherein the flywheel body is cast so as to fill the voids between the magnet to retain the magnets in place after machining of the inner annular ring of the sub-assembly.

* * * * *